March 11, 1969  E. M. JONES, JR  3,431,715
FRUIT HARVESTING HEAD
Filed March 3, 1967
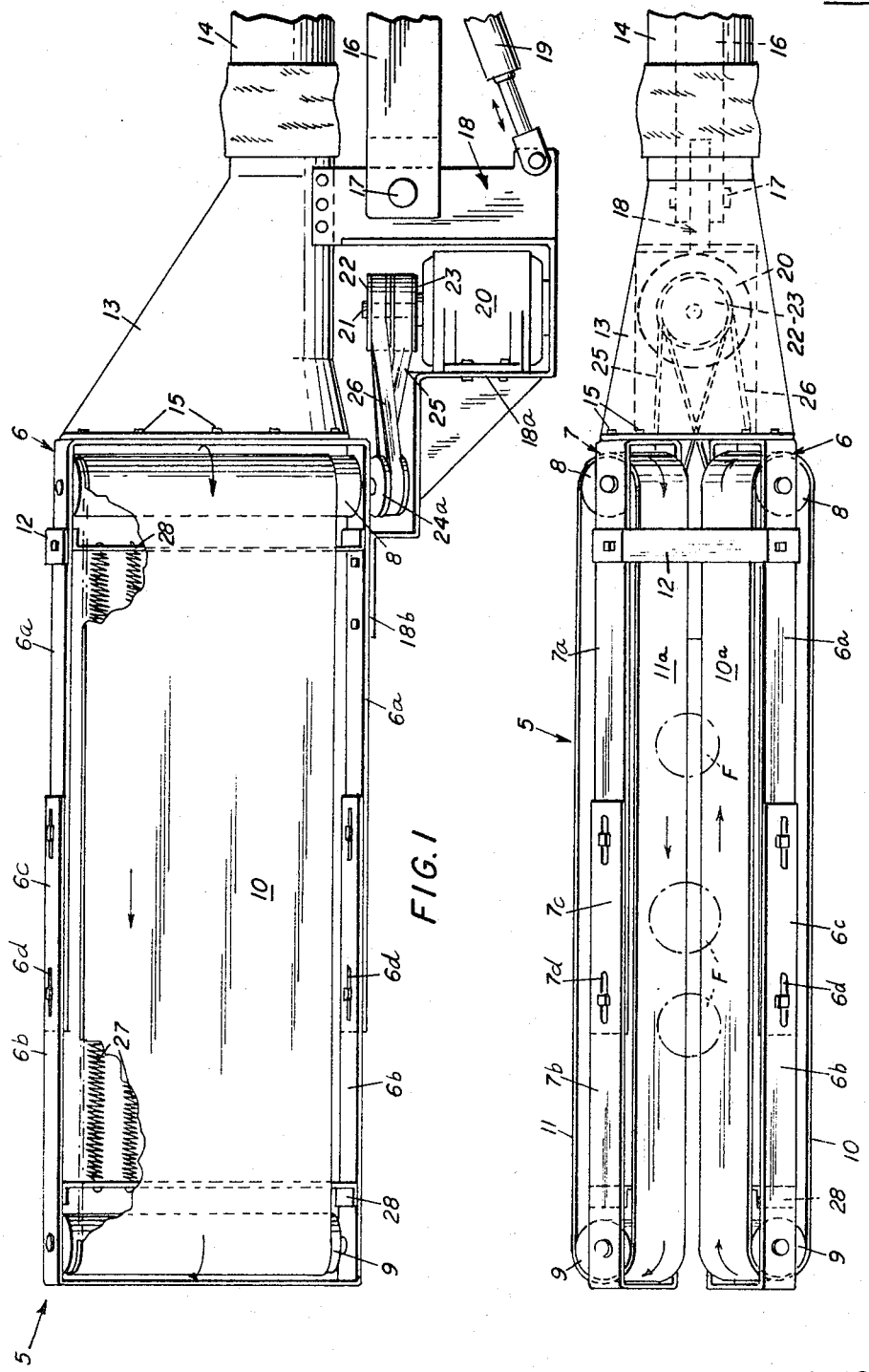
INVENTOR
EDDIE M. JONES, JR.
BY Raphael Semmes
ATTORNEY United States Patent Office 3,431,715
Patented Mar. 11, 1969

3,431,715
FRUIT HARVESTING HEAD
Eddie M. Jones, Jr., Fort Pierce, Fla., assignor to Mech-Pick, Inc., Fort Pierce, Fla., a corporation of Florida
Filed Mar. 3, 1967, Ser. No. 620,394
U.S. Cl. 56—328    9 Claims
Int. Cl. A01g *19/08*

ABSTRACT OF THE DISCLOSURE

The invention is directed to a fruit picking head having a pair of opposed endless belts with adjacent runs diverging upwardly in V-shaped formation and with said adjacent runs moving in opposite directions at different speeds so as to rotate and detach the fruit from the tree.

---

This invention relates to fruit harvesting apparatus, and consists more particularly in new and useful improvements in a fruit harvesting head comprising two opposed, endless fruit gathering belts, respectively arranged to travel in opposite directions around pairs of rollers, the axes of respective pairs diverging upwardly to present the opposed belt surfaces in upwardly and outwardly inclined relation to one another.

The primary object of the invention is to provide a fruit harvesting head of this nature designed for mounting on any suitable positioning support which may be carried by a mobile fruit harvesting unit, such as a truck, tractor, or the like, and adapted to remove the fruit from its stem and start it initially on its course of travel to collecting receptacles.

Another object of the invention is to provide a fruit harvesting head adapted to sever fruit from the stem with a minimum of damage to the fruit per se or the tree, bush or shrub.

Another object of the invention is to provide a fruit harvesting head comprising a pair of opposed, angularly disposed belts, respectively arranged to travel in opposite directions and respectively at different speeds to thereby twist the fruit from its stem and simultaneously advance it to a suitable collecting unit.

A further object of the invention is to provide a fruit harvesting head wherein the lower edges of the opposed belts are transversely spaced from one another to permit the passage of foreign material, such as limbs, branches, leaves and blossoms, while conveying the fruit per se to a collecting unit.

A still further object of the invention is to provide a fruit harvesting head which, although adaptable for use in gathering various types of fruit, is primarily designed for harvesting mature citrus fruit and comprises an arrangement of belts relatively disposed to provide a substantially V-shaped fruit gathering throat so as to accommodate fruits of varying diameters while advancing them to a collecting unit.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is a view of the fruit harvesting head of the invention in side elevation, partially broken away;

FIG. 2 is a top plan view of the fruit harvesting head; and

Figure 3:
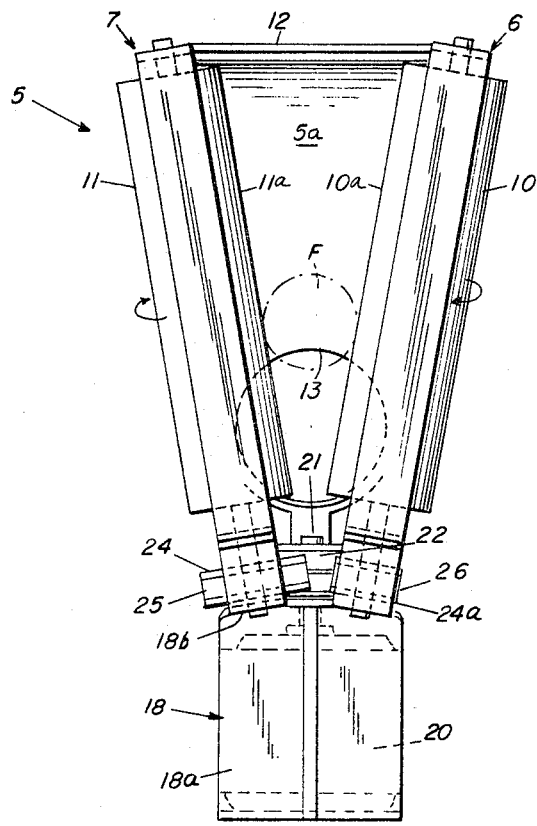
FIG. 3 is a view taken from the inlet or feeding end of the head.

In the drawings, the head is generally represented by the numeral 5 and consists of a frame comprising two, angularly opposed units 6 and 7, as best seen in FIG. 3. Referring to FIGS. 1 and 2, the respective frame units, which are preferably formed of rigid metal strips, consist of pairs of U-shaped elements 6a–6b and 7a–7b, the free ends of the legs of which slidably overlap as at 6c and 7c. The overlapping portions of the frame units are slotted as at 6d and 7d respectively to receive suitable adjusting bolts as shown.

At opposite ends, the respective frame units 6 and 7 are provided with pairs of rollers 8 and 9 which are rotatably supported between the legs of the U-shaped members of the frames, and endless belts 10 and 11 of any suitable material pass around the respective pairs of rollers. Due to the angular relationship of the pair of rollers, as shown in FIG. 3, the belts are so disposed that their opposed inner runs 10a and 11a respectively are presented to one another in upwardly diverging relationship, defining a substantially V-shaped throat 5a between the belts.

This angular relationship is maintained by a cross brace 12 extending across the upper legs at one end of the frame members 6 and 7, and the frame members are bolted to the inlet end of the mouth 13 of a suction hose 14, as at 15. This suction mechanism which forms no part of the present invention may be of any conventional type, many of which are used in this field. Ordinarily, the suction mouth is supported on the end of a main boom 16 which, as shown in FIG. 1, is pivotally connected at 17 to a bracket 18, which, in turn, is under the control of a suitable hydraulic actuator 19.

The bracket 18 is extended forwardly and upwardly as at 18a to support a motor 20, the forwardly extending portion of the bracket being reinforced by connection to the lower legs of the frame members 6 and 7, as at 18b. A motor shaft 21 projects vertically from the motor and has affixed thereto a pair of drive pulleys 22 and 23 of similar diameters which are operatively connected to belt driving pulleys 24 and 24a on the lower ends of rollers 8 by means of belts 25 and 26. The opposite rollers 9 on the frame units are simply idler rollers around which the belts are driven by the drive pulleys 24 and 24a.

As best seen in FIG. 3, the pulley 24a is of smaller diameter than both the pulley 24 and the motor pulley 22, and the belts 25 and 26 are arranged so as to drive both pulleys 8 in clockwise direction so that the opposed inner runs of the belts 10a and 11a travel in opposite directions, the former toward the suction mouth 13 and the latter away from the suction mouth.

The pulley 24a of frame member 6, being smaller than the opposite pulley 24 and motor pulley 22, causes the inner run 10a of belt 10 to travel at a greater speed toward the suction mouth 13 than the inner run 11a of belt 11 travels in the opposite direction. Thus, as the fruit F is engaged by the opposed inner runs of the respective belts, it is twisted from its stem, and, at the same time, caused to travel toward the suction mouth 13 due to the greater speed of advance of the inner run 10a of the belt 10.

In order to provide greater support for the fruit engaging runs of the opposed belts, a series of vertically spaced, elongated coilsprings 27 are stretched between two frames 28 supported by each of the frame members 6 and 7 within the confines of the respective endless belts as shown in FIG. 1. These springs are under constant tension so that as the inner runs of the opposed belts travel along the frame, the belts are adequately supported in contact with the fruit passing through the throat of the head, but provide sufficient resiliency to prevent damage to the fruit.

In operation, the head 5 is manipulated by the boom 16 and hydraulic control 19 into position between the branches of the fruit trees so that the hanging fruit is engaged between the inner runs 10a and 11a of the belts 10 and 11. The movement of these inner runs in opposite directions causes the fruit to spin or twist and drop from its stem whereupon the continued travel of the belts, with the belt 10 travelling at a greater rate of speed than belt 11, causes the fruit to advance toward the suction mouth 13 where it is removed from the head and transferred to a suitable receptable.

It will be apparent that the diverging throat 5a of the head will accommodate a variety of fruit sizes as it passes between the tree branches, the smaller fruit being engaged by the belts in the lower area of the throat, while the larger fruit is engaged in the upper area of the throat. As the belts advance the fruit toward the suction mouth, any foreign material, such as branches, leaves, etc., drop out of the space at the lower end of the throat provided by the spacing of the belts 10 and 11.

Adjustment of the belt tension may be effected by means of the adjustment bolts in slots 6d and 7d so that the U-shaped frame units may be moved longitudinally toward or away from one another and finally clamped at their overlapping ends when the proper adjustment is attained.

From the foregoing, it is believed that the invention may be readily understood by those skilled in the art without further description, it being borne in mind that numerous changes may be made in the details disclosed without departing from the spirit of the invention as set forth in the following claims.

I claim:

1. In combination with the inlet mouth of a fruit harvesting apparatus, a fruit gathering head comprising a pair of opposed, endless belts secured to and projecting forwardly from said inlet mouth, said belts being arranged in laterally spaced, upwardly diverging relation to one another, with their respective inner runs opposed, providing a substantially V-shaped throat communicating with said inlet mouth, and means for separately driving respective belts at different speeds.

2. The combination as claimed in claim 1, wherein said last-named means is adapted to drive both of said belts in the same direction of rotation, whereby the opposed inner runs of respective belts travel in opposite linear directions.

3. The combination as claimed in claim 2, wherein the drive means for one of said belts is adapted to cause the inner run of the latter to advance towards said inlet mouth at a greater rate of speed than the corresponding run of the opposed belt travels in the opposite direction.

4. The combination as claimed in claim 1, wherein said belts are mounted for travel around pairs of spaced rollers, respectively rotatably supported in separate frame members, corresponding rollers of respective pairs being mounted for rotation about upwardly diverging axes.

5. The combination as claimed in claim 4, wherein said frame members are adjustable for regulating the tension of said belts.

6. The combination as claimed in claim 4, including coil spring means extending longitudinally adjacent the undersurfaces of the inner runs of respective belts to provide back-up support therefor.

7. In combination with the inlet mouth of a fruit harvesting apparatus, a fruit gathering head comprising a pair of frame members secured to and projecting forwardly from said inlet mouth, said frame members lying in upwardly diverging planes, drive pulleys and idler pulleys rototably supported in pairs in respective frame members, corresponding pulleys of adjacent pairs being rotatable about upwardly diverging axes, endless belts mounted for travel around respective pulleys, thereby providing a substantially V-shaped throat communicating with said inlet mouth, and means adapted to drive respective drive rollers at different rates of speed.

8. The combination as claimed in claim 7, including means for driving said drive rollers in opposite directions.

9. A fruit gathering head comprising a pair of opposed, endless belts, means portably supporting said belts in laterally spaced, upwardly diverging relation to one another with their respective inner runs opposed, providing a substantially V-shaped throat, means for separately driving respective belts at different speeds, and means communicating with one end of said throat for receiving fruit therefrom.

References Cited

UNITED STATES PATENTS

| | | | |
|---|---|---|---|
| 1,489,552 | 4/1924 | Smith | 56—32 |
| 2,830,425 | 4/1958 | Stansfield | 56—35 |
| 2,968,141 | 1/1961 | McGough | 56—332 |
| 3,161,007 | 12/1964 | Bergquist | 56—332 |

RUSSELL R. KINSEY, *Primary Examiner.*